United States Patent [19]

Bieler et al.

[11] Patent Number: 4,505,995
[45] Date of Patent: Mar. 19, 1985

[54] PLUGGING MICRO-LEAKS IN MULTI-COMPONENT, CERAMIC TUBESHEETS WITH MATERIAL LEACHED THEREFROM

[75] Inventors: Barrie H. Bieler; Floris Y. Tsang, both of Walnut Creek, Calif.

[73] Assignee: The Dow Chemical Company, Midland, Mich.

[21] Appl. No.: 312,588

[22] Filed: Oct. 19, 1981

[51] Int. Cl.³ .................................................. H01M 4/36
[52] U.S. Cl. ..................................... 429/104; 429/193; 29/623.2
[58] Field of Search .................. 429/104, 193, 191, 31, 429/140, 102; 264/36; 29/623.2

[56] References Cited

U.S. PATENT DOCUMENTS

| | | | |
|---|---|---|---|
| 3,499,062 | 3/1970 | Geary, Jr. et al. | 264/36 |
| 3,679,480 | 7/1972 | Brown et al. | 429/104 |
| 3,968,192 | 7/1976 | Hoffman et al. | 264/36 |
| 4,170,695 | 10/1979 | Brown et al. | 429/104 X |
| 4,226,921 | 10/1980 | Tsang | 429/104 |

Primary Examiner—Charles F. LeFevour
Attorney, Agent, or Firm—Robert R. Stringham

[57] ABSTRACT

Cracks, in ceramic wall members, on the order of 1 micron or less in width are plugged helium-tight by selectively leaching a component of the wall member with a solvent, letting the resultant leach form a liquid bridge within the crack, removing the solvent and sintering the resultant residue. This method is of particular value for remedying microcracks or channels in a cell member constituting a tubesheet in a hollow fiber type, high temperature battery cell, such as a sodium/sulfur cell, for example.

15 Claims, 1 Drawing Figure

PLUGGING MICRO-LEAKS IN MULTI-COMPONENT, CERAMIC TUBESHEETS WITH MATERIAL LEACHED THEREFROM

BACKGROUND OF THE INVENTION

The present invention was made in the course of U.S. Department of Energy Contract No. DE-AC02-76ET25103 (formerly Contract No. EY-76-C-02-2565).

Ceramic wall members or "tubesheets" are employed—as separators between molten anolyte and catholyte materials—in essentially all versions of high temperature battery cells, such as sodium/sulfur cells, for example. The materials, procedures and temperatures employed in the fabrication of most types of high temperature cells are such that little tendency for tubesheet cracking to occur would be anticipated.

However, the tubesheet in the most volume-efficient form of high temperature cell, the so-called hollow fiber type cell, is formed by sintering of a "green", preshaped, fiber-pierced mass of weakly cohered solder-glass particles. A greater tendency to produce leaky cells—as a result of tubesheet cracking—is observed for this type of cell. Cost considerations (and others) are such that it is highly desirable to be able to salvage cells (or tubesheet/fiber assemblies) in which the tubesheet is cracked.

Methods of plugging leaks in hollow fiber/tubesheet assemblies are disclosed in U.S. Pat. Nos. 3,499,062, 3,968,192, 4,170,695 and 4,226,921.

The following method, disclosed in the latter ('921) patent, is believed to constitute the closest prior art to the present invention. That is, A. there is provided as the tubesheet/fiber assembly one which comprises a bundle of gas-filled, hollow fiber lengths passing through and sealingly engaged with a rigid, relatively thin wall-member or tubesheet having first and second generally parallel faces, each of said lengths having an open end terminating in or protruding from said first face and at least a majority of said lengths having portions depending from said second face which have closed ends or are generally U-shaped loops having second open ends terminating in or protruding from said first face, B. said first face is covered with a body of a flowable, curable sealant and a pressure differential developed between said body and the exteriors of said dependent fiber portions, thereby
  (1) causing said sealant to flow into the defective fibers and/or tubesheet channels and to displace therefrom at least a portion of the gas contained therein, and
  (2) causing said sealant to flow into the open ends of the non-defective fibers to a limited extent determined by the resistance to compression of the gas they contain, C. the sealant external to the fibers is diluted, D. the exteriors of said dependent fiber portions and the diluted sealant body are subjected to essentially the same reduced pressure, with the results that:
  the gas in the non-defective fibers expands until the pressure inside them is the same as the pressure outside them,
  the undiluted sealant in the non-defective fibers is expelled and the diluted sealant intrudes slightly into them,
  the column of sealant in each defective fiber and tubesheet channel remains in place and no more than a small terminal portion of it is diluted, E. while maintaining the pressure equilibrium established in step D, the main body of the diluted sealant is removed from contact with the tubesheet, F. optionally, said first face and open fiber ends are rinsed with a diluent, and G. the sealant is cured in the defective fibers and/or tubesheet channels, thereby plugging them, said sealant being so composed as to be convertible, in-situ in said defective fiber lengths or channels and at a temperature below the distortion temperature of said fibers, to plugs of a solid, non-porous material sealingly bonded to the fiber or channel walls and having a coefficient of expansion substantially matching that of the fiber material.

It is taught in the '921 patent (at lines 24-48, column 10) that the sealant can be a solution of a material composed of the same relative amounts of the same ingredients as the tubesheet itself. However, the solder glasses from which the tubesheets in presently known hollow fiber type, high temperature battery cells are made are soluble in their entirety only in solvents, such as water, which intolerably damage the glass fibers. Accordingly, the practice of the '921 method in fabricating (hollow fiber type) high temperature battery cells is limited to the use of slurries of fine particles of the tubesheet glasses.

Methods of fine-grinding solder glasses have been devised but it is generally not feasible to grind such glasses so finely as to provide particles which can be emplaced in sub-micron tubesheet cracks or channels.

The disclosure of U.S. Pat. No. 4,226,921 is hereby incorporated in this application, by reference, for all purposes which such incorporation may serve in accordance with U.S. patent laws.

OBJECTS OF THE INVENTION

The primary object of the present invention is to provide a method by which hollow fiber type, high temperature battery cells comprising micro-cracked tubesheets can be rendered helium tight.

A corollary object is to provide such a method which utilizes the ability of some solvents to selectively dissolve certain components of some multi-component glasses.

A further object is to provide such a method which utilizes a portion of the tubesheet material itself for in-situ plugging of the microcracks.

A further object is to provide a method of sealing microcracks in ceramic wall members in general, not just tubesheets.

An additional object is to provide such a process which can be carried out in-situ on a tubesheet/fiber assembly which has been incorporated in an essentially completed cell.

It is also an object to provide a leak-remedying method which does not require the use of a slurry.

Still other objects will be made apparent to those knowledgeable in the art by the following specifications and claims.

As used herein, the term "high temperature battery cell" means a cell normally operated at temperatures above about 250° C.

SUMMARY OF THE INVENTION

Figure 1:
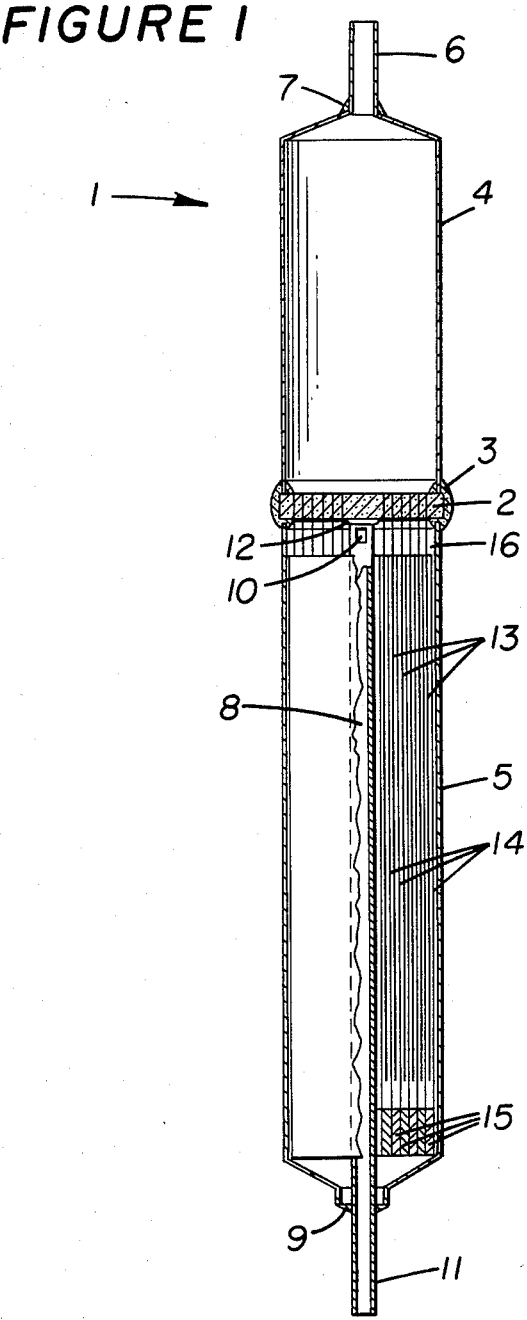
FIG. 1 depicts a hollow fiber type sodium/sulfur cell, not yet charged with anolyte and catholyte. It is an elevational cross-section through the vertical axis of the cell, except that the left-hand portion of the outermost, cylindrical wrap of a current-collecting foil is not cut away as it would be in a true crosssection.

Stated in simplest terms, the present invention—broadly—is plugging microcracks in multi-component ceramic wall members by redepositing therein plugs of material selectively leached from the wall member in situ. The term "microcrack" is intended to include channels along fiber/tubesheet interfaces when the wall member is a tubesheet, the crack or channel being of a width or diameter, at its smallest cross-section, such that it can be bridged by the solution from which the leached material is to be deposited; the advantages of the invention are particularly apparent for the plugging of cracks having widths or diameters less than about one micron.

The application of the invention to tubesheet/fiber assemblies is not limited to those assemblies which are leak-free, except for the microcracks in the tubesheet. So long as any other leak paths present can be closed by other means, either before or after the microcracks are plugged, the assembly can be rendered helium-tight by a process including the leaching, redeposition and resintering steps which effect plugging of the microcracks.

The invention may be more narrowly defined as a process of rendering helium-tight a tubesheet/hollow fiber assembly having one or more microcracks through the tubesheet, said process comprising:

(1) providing as said assembly one comprising a bundle of ceramic hollow fiber lengths passing through and sealingly engaged with a rigid, multi-component, ceramic wall member or tubesheet having first and second generally parallel faces; each of said lengths having an open end terminating in or protruding from said first face and having a portion, depending from said second face, which has a closed end or is a generally U-shaped loop having a second open end terminating in or protruding from said first face, a component of said tubesheet being fusible at a temperature below the softening temperature of the tubesheet per se and being selectively leachable therefrom by an otherwise inactive solvent capable of wetting any fiber surfaces exposed in the cracks, (2) selectively leaching said lower melting component from said tubesheet with said solvent, thereby forming a body of solution within each of said cracks, (3) removing the solvent from each of said solution bodies, thereby redepositing the leached material in the cracks, (4) heating the resulting deposits and causing them to sinter at a temperature below said softening temperature, thereby converting them to plugs which will prevent the flow of helium through said cracks from either of said faces to the other, and (5) allowing the assembly to cool.

The term "ceramic" is used in the foregoing definition of the invention (and subsequently herein) in its broadest sense, i.e., as including glasses. It should be noted that it is not essential to the practice of the invention that the fibers consist of a multicomponent material or be leachable by the solvent.

The method and criteria by which helium-tightness is to be assessed are discussed subsequently herein.

DETAILED DESCRIPTION

Procedures for the practice of the invention with solvents in liquid and vapor form will be described with reference to the empty cell—shown in 1:1 scale in of FIG. 1—after the cell itself is described.

Referring now to the figure, the cell (indicated generally as element 1) consists of a microcracked (cracks not depicted), ceramic tubesheet (2) to which are sealed in abutting relationship thereto, by glass seals (3), an aluminum anolyte (sodium) tank (4) and an aluminum catholyte (sodium polysulfide) reservoir (5). A tubular neck (6), sealingly joined to tank (4) by an annular weld (7), functions first as a sodium fill port and then (with its upper end crimped shut) as the anode lead from the cell. A vertically disposed, hollow aluminum tube (8) is abutted at its upper end against the bottom surface of tubesheet (2) and extends out the bottom of the catholyte container, to which it is sealingly joined by an annular weld (9). This tube is first utilized as a forming mandrel for the tubesheet/fiber assembly, then functions (by way of the "window" (10) at its upper end) as a catholyte fill port; next, when crimped shut at its lower end, as the cathode lead (11) from the cell and, finally, as a support pedestal for the tubesheet (to which it is joined by an annular glass seal (12)). A large number of hairlike, hollow glass fibers (13), closed at their lower ends, pass through the tubesheet (2) and communicate, through open ends at the upper tubesheet face, with the anolyte tank (4). The fiber walls are permeable to cations ($Na^+$, for example) of the anode material and function as the electrolyte (and as a separator) in the cell. Generally cylindrical wraps (14) of a carbon-coated, perforated, aluminum foil, disposed in a spiral configuration between generally concentric rows of the fibers functions as a cathodic current collector. The lower ends of the foil wraps extend below the fiber ends and are in tight contact with a spirally wound, aluminum spacer tape (15) which is of a thickness such that adequate catholyte space is provided between the successive foil and fiber "layers" and is in electrically conductive contact with tube (8) (see the above-referenced '921 patent for details of construction). A space (16) between the top of the foil wraps (14) and the lower face of the tubesheet is provided to accommodate the increase in catholyte volume which occurs during discharge of the cell. (The corresponding decrease in anolyte volume results in a partial vacuum in the anolyte container; the upward force exerted on the tubesheet by the resulting pressure differential is resisted by the connection (12) between the tubesheet and the "pedestal" (tube (8)).)

In one version of cells of the foregoing type the fibers are composed of a relatively hard and high melting glass of the formula $Na_2O.B_2O_3.0.16\ NaCl.0.2\ SiO_2$ and the tubesheet of a 94% $B_2O_3$/6% $Na_2O$ solder glass. It has been discovered that a portion of the $B_2O_3$ in glasses of high $B_2O_3$ content can be leached out (as a soluble reaction product, methyl boroxime) with a solvent (MeOH) which is otherwise non-active (does not deleteriously affect the fibers or other cell components to an intolerable extent). It has further been found that stripping of the resulting solution (leach) results in formation of a viscous liquid deposit which will form a rigid plug between adjacent walls of microcracks in such glasses when heated to an appropriate temperature below the temperature at which the tubesheet itself softens enough to be distorted by its own weight. These findings are utilized in the following procedures.

LEAK PLUGGING PROCEDURES

The plugging operation is carried out in a dry room (relative humidity less than 6%; preferably less than 3%). The empty cell is initially positioned vertically and lightly clamped around the anode cup.

(1) Using liquid solvents (exemplified by methanol).
   A. Five ml. of absolute methanol (MeOH) is placed on the upper surface of the tubesheet by means of a capillary dropper tube inserted in the anode cup through the upper fill port.
   B. After a leaching period of from about 5 minutes or more (preferably about 10 to about 15 minutes), a small breather tube is inserted in the anode cup, which is then inverted to drain out the excess methanol.
   (Entry of the leaching solvent into unbroken, i.e., closed-ended, fibers is largely prevented by the presence of the gas (air or nitrogen, ordinarily) in the fibers, which may have bore diameters as small as 10 microns (or less). Solvent entry into broken fibers will occur, but—unless the fibers are very small in diameter and contain a leachable component—these fibers will generally not be plugged off by the present method.)
   C. The cell is placed in a tubular vacuum chamber and pumped down for about 10 minutes with a vacuum "roughing" pump to a pressure of about 10–20 $\mu$m Hg. This volatilizes the free methanol and "strips" the leach—including that residing within the tubesheet cracks.
   D. The viscous liquid residue (methyl boroxime) deposited in the cracks by the stripping step is decomposed to $B_2O_3$ (and MeOH) and sintered by heating the cell in an upright position—in an insulated vacuum oven (15±5 $\mu$m Hg) and over a period of from about 0.5 to about 2.5 hours—to an appropriate temperature (335°±15° C. for high borate solder glasses). The cell is then allowed to cool under vacuum, over a period of about 18 hours, to a temperature of 70°±10° C. The insulation is removed and the cell allowed to cool to ambient temperature (usually 10–30 minutes).
   E. The cell is then tested for helium tightness (in the same manner in which the presence of leaks in the untreated cell was determined), as described hereinafter.
   The "tightness" of the cell is rated from "helium leak tight" ($<1\times10^{-9}$ cc He/second) to "off scale" ($>10,000\times10^{-9}$ cc He/sec.).

(2) Vapor treatment.
   It has been found that leaching can be done by in-situ condensation of solvent vapors within the crack or channel which constitutes a leak. (The vapor pressure of the solvent is effectively reduced by the capillary wetting action within the cracks; it is further reduced as the condensate takes up the leached $B_2O_3$/MeOH reaction product.)
   The vapors are provided, in lieu of step A above, by bubbling dry, pre-purified nitrogen (about 10±2 ml/minute) through absolute MeOH in a flask and directing the exit stream therefrom through a small diameter, loose fitting tube (inserted through the upper fill port into the anolyte tank). The alcohol-saturated gas is allowed to impinge on the tubesheet surface for about 5 or more minutes (preferably about 5 to about 20 minutes) and the flow is then terminated.
   Since no "free" liquid methanol is present to be drained out, cell inversion is unnecessary and the subsequent treatment is otherwise identical to steps C-E above.

(3) Modified vapor treatment.
   A. Liquid methanol is placed in the anolyte cup as in procedure (1) but the upper fill port is stoppered and the cell immediately inverted. The requisite vapors are provided by the vapor pressure of the liquid. After about 5 minutes or more (preferably 5 to 20 minutes) the stopper is removed, a breather tube inserted and the liquid drained out as in procedure (1). Thereafter, steps C-E are the same.

Any of the foregoing procedures of course can be employed for remedying leaks in a tubesheet/fiber (and foil, etc.) assembly which has not yet been incorporated in a cell. However, this requires casing of the assembly in some manner and, since damage may still occur during subsequent incorporation in a cell, this alternative is primarily of interest as a part of a research protocol which stops short of cell completion (as in the Examples herein).

Suitable tubesheet materials for the practice of the present invention are multi-component materials comprising a component which can be selectively leached from the tubesheet itself (usually from the walls of the cracks in the tubesheet) by a suitable solvent and then redeposited in the crack (at a sufficiently narrow cross-section) by removal (as by volatilization) of the solvent. It is also essential that the redeposited material be of such a nature that it will alter—when heated to a "sintering" temperature below the lowest temperature at which any undesirable changes in the cell are thermally induced—to a helium-impermeable plug bridging across the crack (or channel). It is not necessary for the leached material to be converted to a reaction product by its interaction with the solvent but it must still meet the foregoing essential requirements.

To be suitable for use as a tubesheet in the first place, the tubesheet material (as a whole, at least) necessarily must be capable of sintering to a rigid, integral body which occupies the spaces between the fibers and (when uncracked) is helium-impermeable.

Specific tubesheet materials known or believed to be suitable for the practice of the invention are the 94% $B_2O_3$/6% $Na_2O$ glass above referred to and the (high boron oxide content) borosilicate glasses disclosed in U.S. Pat. No. 4,224,386.

Among the latter glasses, those having compositions within the following limits are preferred:
$Na_2O$: 1.5–4.5 mole %
$B_2O_3$: 92–96 mole %
$SiO_2$: 2.5–4.0 mole %.

Particularly preferred is the glass of the composition:
$Na_2O$: about 3.5 mole %
$B_2O_3$: about 93.7 mole %
$SiO_2$: about 2.8 mole %.

A method of assessing the suitability of other ceramic tubesheet materials is discussed subsequently herein.

Presently most preferred are assemblies in which the tubesheet is a sodium borosilicate glass of the preferred type above and the fibers have the composition:

$Na_2 \sim 29.8$ mole %, $B_2O_3 \sim 59.5$ mole %, $SiO_2 \sim 5.9$ mole % and $NaCl \sim 4.8$ mole %.

Suitable solvents are those which are (a) capable of wetting both the tubesheet and fiber surfaces, (b) capable of selectively solubilizing and/or dissolving one or more (but not all) components of the tubesheet material, (c) otherwise inactive, and (d) readily removable (volatilizeable) from the resulting solution (to leave a residue having the properties specified in the preceding section).

The only specific solvent which has actually been tried is methanol. Experiments have indicated lower heats of wetting (of high borate and borosilicate glasses) by higher ($C_2$-$C_4$) alcohols but the latter are believed to be operable in the process. Although water, per se, is not considered suitable for tubesheet glasses (or fiber glasses) of the compositions so far employed in hollow fiber type, high temperature cells, the use of dilute solutions of water in various solvents, such as—for example—alcohols, acetone, ethylene glycol monomethyl ether and cyclohexanone, may be suitable for such glasses.

Further, water may be suitable, without dilution, for other multi-component ceramics having the requisite properties for use in high temperature hollow fiber type cells.

The suitability of any candidate solvent/tubesheet material combination can be assessed, without undue experimentation, by tests directed to each of the several separate requirements spelled out above. Those skilled in the art are quite capable of designing and carrying out such tests, without further instruction here. Elimination of a solvent unsuitable for treatment of a given tubesheet/fiber assembly will often be possible on the basis of a single, simple test, since all of the stipulated requirements are essential.

Suitable leaching times have been indicated in the foregoing descriptions of several of the procedures which may be employed. In any case, however, it is desirable from the standpoints of both process efficiency and avoiding tubesheet and/or fiber damage to minimize the period of contact between the solvent and the tubesheet/fiber assembly. As shown in some of the subsequent examples, it is feasible to repeat the plugging operation if the contact time used proves insufficient (assuming all cracks and channels are indeed of "micro" dimensions). However, once damaged by excessively prolonged leaching, a cell cannot be repaired by the present method.

It is contemplated that in actual manufacture of hollow fiber type, high temperature cells, those found to leak helium at rates indicative of microcracking will be subjected to treatment by the present method for a standard contact time first approximated by bracketing experiments and then refined by experience.

The present process is not necessarily limited to volatilization as the method of "removing" the solvent contained in the leach solution. Although considered definitely less desirable, precipitation of the leached material by temperature reduction or by extraction of the solvent with a non-solvent for the dissolved material, followed by decantation of the "mother liquor", can be resorted to.

Suitable sintering conditions will generally have to be determined for each specific combination of a wall-member composition and selectively leachable component thereof (and fiber composition, if fibers be present and channeling along tubesheet/fiber interfaces tends to occur). Considerable guidance will generally be provided by what is already known about sintering requirements for wall-member formation. In addition, test deposits of the selectively leachable material can be prepared by leaching the powdered tubesheet material with the chosen solvent, and evaporating the solvent from the resulting leach. The behavior of the deposit as it is heated to successively higher temperatures can then be observed with a microscope. Once a temperature at which sintering behavior is observed is found, another such deposit can be formed in contact with both of two adjoining (but appropriately spaced apart) rods of the wall-member material and sintered at that temperature until it appears (under the microscope) to have formed a continuous bridge between and bonded to the rods. The resulting composite specimen can be allowed to cool (slowly) and then examined for integrity, strength, porosity, etc. Finally, the sintering conditions thus arrived at can be tried in application of the present invention to a microcracked wall member of the type to be fabricated or used, for a particular purpose.

For the high borate glasses indicated earlier herein to be preferred as tubesheet glasses, suitable conditions are considered to be from about 0.5 to about 2.5 hours at temperatures of from about 355° to about 320° C. However, in most instances about 0.5 hour at about 325° C. will give excellent results.

The following examples are for purposes of illustration and are not to be construed as limiting the scope of the present invention in a manner inconsistent with the claims appended to these specifications.

EXAMPLES

In the following examples, each tubesheet/fiber assembly (including the mandrel, foil, etc.) was joined to the anode cup, as depicted in FIG. 1, but (unless otherwise indicated) not to a cathode cup. The partially completed cell was first tested for tightness as follows, i.e., it was suspended within a glass cylinder open at the bottom and closed at the top except for a rubber friction seal through which the fill tube extending from the anode cup was passed. A rubber stopper, pierced by a tubing length (connected by a 3-way valve to vacuum and helium sources) was inserted in the lower end of the cylinder. The fill tube was connected to a Varian, Model 925-40, mass spectrographic unit capable of detecting helium flows as small as $10^{-9}$ cc (measured at Standard Conditions) per second. The cylinder volume (except for the anode cup) was evacuated briefly and then restored to and kept at atmospheric pressure with helium gas. The detector was operated, thereby evacuating the anode cup, and the rate of helium flow through the detector measured.

Next, the incomplete (leaky) cell was treated, with methanol or methanol vapors, by one of the procedures described earlier herein.

The treated "cell" was then rechecked for tightness. If the leakage rate was found to have been reduced to a measurable but relatively low level (about $2000 \times 10^{-9}$ cc/sec., or less), it was, in some cases, retreated (and rechecked for tightness). If the leakage rate, after 1 or more treatments, was found to have increased, crack enlargement by excessive leaching or seal damage during re-sintering (or mechanical damage) was assumed to have occurred. If the original leakage rate was not reduced by the treatment, the source of leakage was assumed to be one or more broken fibers, relatively large tubesheet cracks, imperfect tubesheet to anode cup sealing or an imperfect anode cup to fill tube weld. In some cases, the leakage was eliminated (or reduced to a treatment-responsive condition) by applying an epoxy resin to the suspected seal and/or weld. (Other, known, sealing procedures of course would be used for this purpose in actual battery cell manufacture.)

A total of about ten complete but leaky cells, rendered helium-tight by the foregoing method and charged with sodium and sodium polysulfide, were subjected to prolonged discharge/charge cycling (as described later herein) to demonstrate that the leak plugging method used does not detrimentally affect cell life or performance.

In each instance, the tubehseet consisted of a sodium borosilicate glass having the composition: ~3.5 mole % $Na_2O$, ~2.8 mole % $SiO_2$ and ~93.7 mole % $B_2O_3$.

EXAMPLE 1

The results given in Table 1 were obtained by leaching "cells" (incomplete) with liquid methanol for the time periods indicated, "rough"-pumping the drained unit for ten minutes and sintering for 0.5 hour at the temperature given. Two of the cells (designated by asterisks) were re-treated by the plugging procedure.

TABLE 1

| Cell No. | Leach Period, Minutes | Resinter Temperature °C. | He Flow Rate (c.c./sec.) × $10^9$ Before Treatment | After Treatment | Remarks |
|---|---|---|---|---|---|
| AS 17 | 20 | 325 | 320 | 1 | |
| 28 | 60 | 325 | 400 | 110 | |
| 51 | 10 | 325 | 40 | <1 | = "Helium Tight" |
| 49 | 15 | 326 | 4 | <1 | |
| 54LM | 10 | 325 | 1500 | 100 | |
| 54LM* | 10 | 326 | 100 | <1 | Retreated |
| 59 | 15 | 332 | 5 | 60 | Weld defective |
| — | — | — | 60 | <1 | Weld coated with epoxy |
| 63 | 15 | 325 | 75 | 3 | |
| 77 | 30 | 325 | 70 | 8 | |
| 84 | 60 | 325 | 100 | >$10^4$ | Leakage increased |
| 86 | 20 | 325 | 860 | 5 | |
| 98 | 15 | 332 | 400 | >$10^4$ | Mechanical damage suspected |
| 102 | 30 | 332 | >$10^4$ | 50 | |
| 103 | 30 | 332 | 9900 | 1700 | |
| 107 | 15 | 326 | >$10^4$ | 2000 | |
| 107* | 60 | 325 | 2000 | >$10^4$ | Damage during retreatment |
| 122 | 120 | 325 | 70 | 70–80 | (Not constant) |
| 128 | 60 | 325 | 110 | <1 | |
| 140 | 10 | 325 | 450 | <1 | |
| 147LM | 15 | 325 | 490 | 8 | |
| 148LM | 20 | 325 | 440 | <1 | |
| 150LM | 60 | 325 | 360 | >$10^4$ | Mechanical damage suspected. |

It is evident from the results in Table 1 that more or less effective plugging was achieved with about half of the cells treated. It is not known what proportion of failures was due to mechanical, thermal or over-leaching damage during the plugging procedure. However, the efficacy of treatment and retreatment of "cells" 54LM and 107 for completely plugging rather large initial leaks is shown. There would appear to be some indication that the crack structures responsible for the initial leaks in some of the cells were of such a nature that leach periods of 60 minutes were too long.

By judgement of resistance to breaking fibers off from the tubesheet by manual flexure, the fiber strengths before and after treatment of the foregoing cells AS84, 102 and 150 were found, if changed at all, to be greater after the treatments.

EXAMPLE 2

The procedure of Example 1 was used to treat four additional, incomplete cells, except that substantially higher resintering temperatures were employed. The results are given in Table 2.

TABLE 2

| Cell No. | Leach Period, Minutes | Resinter Temperature °C. | He Flow Rate (c.c./sec × $10^9$) Before Treatment | After Treatment |
|---|---|---|---|---|
| AT 6 | 20 | 340 | 84 | <1 |
| AS 100 | 20 | 340 | >$10^4$ | 800 |
| AS 139 | 20 | 350 | 175 | <1 |
| AS 182 | 20 | 350 | >$10^4$ | 4000 |

It is evident that resintering temperatures as high as 350° C. are satisfactory for adequately leached tubesheets of the composition given above.

EXAMPLE 3

The cells listed in Table 3 were treated with methanol-saturated nitrogen gas in the manner described earlier herein, rough-pumped 10 minutes and resintered 0.5 hour (except as noted) at about 325° C. The leach times and results are given in Table 3.

TABLE 3

| Cell No. | Vapor Leach Period, Minutes | He Flow Rate (c.c./sec.) × $10^9$ Before Treatment | After | Remarks |
|---|---|---|---|---|
| AX-7 | 10 | 7 | <1 | |
| AT-23 | 10 | 1800 | 70 | |
| AV-26 | 10 | 45 | 30 | |
| AT-27 | 10 | 80 | <1 | |
| | 30 | 2600 | 250 | |
| AV-31 | 10 | 90 | >$10^4$ | Damaged? |
| | 38 | 15 | 4 | <1 | |
| AT-40 | 10 | >$10^4$ | 30 milli | Torr |
| 41 | 10 | 9 | <1 | |
| 42 | 60 | 17 | <1 | |

TABLE 3-continued

| Cell No. | Vapor Leach Period, Minutes | He Flow Rate (c.c./sec.) × 10$^9$ Before Treatment | After Treatment | Remarks |
|---|---|---|---|---|
| 45 | 10 | 140 | 4 | |
| Av-63 | 10 | 600 | <1 | 2 hr. Resinter |
| AT-71 | 10 | 4 | <1 | |
| AV-82 | 10 | 5500 | 650 | |
| AS-83 | 10 | 45 | <1 | Weld covered With Epoxy |
| 88 | 10 | 88 | <1 | |
| AW-154 | 10 | 12 | <1 | |
| 155 | 10 | 12 | <1 | |
| 176 | 10 | 30 | 5 | |
| 208 | 10 | 80 | <1 | |
| 211 | 10 | 100 | <1 | |
| 212 | 10 | 30 | <1 | |

Note:
The methanol used to treat AV-63 had been kept a month under conditions such that some moisture may have been picked up.

It will be seen that introduction of the methanol as a vapor appears to have been generally more effective than use of liquid methanol, even when the initial leak rate was relatively high. Vapor introduction is more closely controllable and appears to give more consistent results.

It is evident from the several foregoing examples that leaks of a magnitude indicative of microcracking are effectively eliminated by introducing the leach solvent as either a vapor or liquid.

EXAMPLE 4

Cycling Life Test

The "cell" (assembly) denoted as AS139 was incorporated in a complete cell (as depicted in FIG. 1), retested for tightness, charged with sodium and sodium polysulfide, sealed and "deep-cycled" 779 times, over a lifetime of 377 days between a catholyte composition (at termination of discharge half-cycle) of Na$_2$S$_{3.5}$ and (at termination of charge half-cycle) of 30 wt. % Na$_2$S$_5$ 70 wt % S (two-phase region).

What is claimed is:

1. The process of plugging one or more microcracks in a multicomponent ceramic wall member which comprises selectively leaching the wall member with a solvent for one of said components and re-depositing the dissolved material in the crack or cracks by removal of said solvent from the resulting leach solution.

2. The process of claim 1 in which the smallest cross-sectional width or diameter of said microcrack is less than 1 micron.

3. The process of claim 1 in which said wall member is the tubesheet in a tubesheet/hollow fiber assembly suitable for use in a high temperature battery cell.

4. The process of rendering helium-tight a tubesheet/hollow fiber assembly having one or more microcracks through the tubesheet, said process comprising:
   (1) providing as said assembly one comprising a bundle of ceramic hollow fiber lengths passing through and sealingly engaged with a rigid, multi-component, ceramic tubesheet having first and second generally parallel faces; each of said lengths having an open end terminating in or protruding from said first face and having a portion, depending from said second face, which has a closed end or is a generally U-shaped loop having a second open end terminating in or protruding from said first face,
   said microcracks passing through said tubesheet from said first face to said second face, and
   a component of said tubesheet being fusible at a temperature below the softening temperature of the tubesheet per se and being selectively leachable therefrom by an otherwise inactive solvent capable of wetting any fiber surfaces exposed in the cracks,
   (2) selectively leaching said lower melting component from said tubesheet with said solvent, thereby forming a body of solution within each of said cracks,
   (3) removing the solvent from each of said solution bodies, thereby redepositing the leached material in the cracks,
   (4) heating the resulting deposits and causing them to sinter at a temperature below said softening temperature, thereby converting them to plugs which will prevent the flow of helium through said cracks from either of said faces to the other, and
   (5) allowing the assembly to cool.

5. The process of claim 4 in which said assembly is leak-free, except for said microcracks.

6. The process of claim 4 in which other leak paths, in addition to said microcracks, are present in said assembly and said process additionally comprises blocking those paths, either before or after plugging the microcracks.

7. The process of claim 4 in which said tubesheet glass is a solder glass having a high B$_2$O$_3$ content and said solvent is methanol.

8. The process of claim 7 in which said glass has a composition within the following limits: Na$_2$O, 1.5–4.5 mole %; B$_2$O$_3$, 92–96 mole % and SiO$_2$, 2.5–4.0 mole %.

9. The process of claim 7 in which the rate of said cooling is controlled so that the temperature of the assembly declines uniformly over a period of about 18 hours to 70° ± 10° C. and the assembly is then allowed to cool freely to ambient temperature.

10. The process of claim 8 in which said fibers are of the composition: Na$_2$O, ~29.8 mole %; B$_2$O$_3$ ~59.5 mole %; SiO$_2$, ~5.9 mole % and NaCl, ~4.8 mole %.

11. The process of claim 10 in which the tubesheet glass is of the composition: Na$_2$O, ~3.5 mole %; B$_2$O$_3$, ~93.7 mole % and SiO$_2$, ~2.8 mole %.

12. The process of claim 4, carried out after said assembly has been incorporated in an otherwise complete battery cell which has not been charged with anode and cathode materials or sealed shut.

13. A tubesheet/hollow fiber assembly, incorporated in a high temperature battery cell, which has been rendered helium-tight by the process of claim 4.

14. The process of rendering helium-tight a tubesheet/hollow fiber assembly having one or more microcracks through the tubesheet, said process comprising:
   (1) providing as said assembly one comprising a bundle of ceramic hollow fiber lengths passing through and sealingly engaged with a rigid, multi-component, ceramic tubesheet having first and second generally parallel faces; each of said lengths having an open end terminating in or protruding from said first face and having a portion, depending from said second face, which has a closed end or is a generally U-shaped loop having a second open end terminating in or protruding from said first face,
   said microcracks passing through said tubesheet from said first face to said second face, and a component of said tubesheet being fusible at a temperature below the softening temperature of the tubesheet per se and being selectively leachable therefrom by an otherwise inactive solvent capable of wetting any fiber surfaces exposed in the cracks, (2) selectively leaching said lower melting component from said tubesheet with said solvent, thereby forming a body of solution within each of said cracks, (3) removing the solvent from each of said solution bodies, thereby redepositing the leached material in the cracks, (4) heating the resulting deposits and causing them to sinter at a temperature below said softening temperature, thereby converting them to plugs which will prevent the flow of helium through said cracks from either of said faces to the other, and (5) allowing the assembly to cool.

said tubesheet glass being a solder glass having a high $B_2O_3$ content, said solvent being methanol and said leaching step being carried out by contacting said tubesheet with the methanol for a period of from about 10 to about 120 minutes and said step (4)—as recited in claim 4—is carried out by sintering said deposits for a period of from about 0.5 to about 2.5 hours at a temperature of from about 350° to about 320° C.

15. The process of claim 14 in which said contact is affected by directing a stream of methanol-saturated gas against said first face of the tubesheet, for a period of about 10 minutes.

* * * * *

UNITED STATES PATENT AND TRADEMARK OFFICE
CERTIFICATE OF CORRECTION

PATENT NO. : 4,505,995
DATED : March 19, 1985
INVENTOR(S) : Barrie H. Bieler and Floris Y. Tsang It is certified that error appears in the above—identified patent and that said Letters Patent is hereby corrected as shown below:

Column 14, line 4, please delete the period and insert -- ; -- at the end of the line;

Column 14, line 12, please delete "350°" and insert -- 355° -- .

Signed and Sealed this

Fifteenth Day of October 1985

[SEAL]

Attest:

Attesting Officer

DONALD J. QUIGG

Commissioner of Patents and Trademarks—Designate